Patented Oct. 22, 1935

2,018,643

UNITED STATES PATENT OFFICE 2,018,643

METHOD OF PLASTICIZING RUBBER AND PRODUCT THEREOF

Ira Williams, Woodstown, and Carroll Cummings Smith, Carneys Point, N. J., assignors to E. I. du Pont de Nemours & Company, Wilmington, Del., a corporation of Delaware No Drawing. Application June 16, 1934, Serial No. 730,914

13 Claims. (Cl. 106—23)

This invention relates to a method for making shaped rubber articles and, more particularly to methods whereby the rubber is rendered more plastic so that it may be more readily formed or shaped.

In the usual manufacturing operations for producing vulcanized rubber articles, the rubber, after being compounded with the desired fillers and vulcanizing ingredients, is subjected to a shaping operation prior to vulcanization. This shaping operation may consist of calendering to produce sheets either alone or superimposed on a fabric or other support or to produce an embossed design on the surface of the rubber, or may consist of passing the rubber through dies of different designs, or may consist of placing the rubber in molds and then subjecting it to pressure so as to cause the rubber to flow and conform to the contour of the mold cavity filling the angles and designs therein.

In conducting such shaping operations, it is difficult to control the thickness or shape of the rubber and to prevent shrinkage of the rubber after being shaped and to cause the rubber to flow sufficiently to fill angles, lettering or similar designs in the mold cavity. These difficulties are due to the elastic property of rubber which tends to cause the rubber to regain its original form and to resist deformation. In order to overcome these difficulties in the manufacture of shaped rubber articles, it has been proposed to incorporate into the rubber various materials, such as oils, fats, waxes, esters, tars and the like, which have the property, when mixed with the rubber, of causing the rubber to flow somewhat more easily. In many cases, these materials have objectionable properties which render it undesirable to add them to the rubber. Under these circumstances, recourse is had to more severe and continued working of the rubber on the mill. It is well known that rubber becomes more plastic during the milling operation. It is also well known that the degree of plasticity of the rubber will generally increase with increase in the severity and length of time of the milling. However, it is generally undesirable to subject rubber to a milling operation sufficient to give the rubber the desired plasticity for shaping operations as such milling tends to destroy the internal structure of the rubber and produces a final product of very inferior physical properties.

An object of the present invention is to provide a method of treating rubber whereby the rubber will be rendered more plastic and may be more readily shaped. A further object is to provide a method of treating rubber whereby the rubber may be rendered sufficiently plastic for substantially all shaping operations which method requires little or no milling. A still further object is to provide a method of treating rubber which will render less difficult the calendering, embossing, tubing, or other shaping operations prior to vulcanization and which will, to a large extent, eliminate the difficulties heretofore encountered in such operations. Other objects are to provide new compositions of matter and to advance the art. Still other objects will appear hereinafter.

These objects may be accomplished in accordance with our invention which comprises subjecting rubber to the action of small amounts of plasticizing agents, comprising unsymmetrically substituted hydrazines and their salts, for a sufficient length of time for the rubber to attain the desired plasticity, and then subjecting the plasticized rubber to the shaping and vulcanizing operations.

The hydrazine compounds of our invention which exert this plasticizing action on unvulcanized rubber comprise the class of unsymmetrically substituted hydrazine compounds represented by the formula

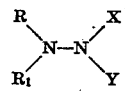

and salts thereof, wherein R represents an alkyl aralkyl or aryl nucleus, $R_1$ represents hydrogen or an alkyl, aralkyl or aryl nucleus, X represents hydrogen, one valence of a double bonded carbon atom, or an alkyl, aralkyl or aryl nucleus but must be of a different class than R when $R_1$ is hydrogen, and Y represents hydrogen or one valence of a doubly bonded carbon atom. R and $R_1$ may also represent terminal carbon atoms of a cyclic group in which the nitrogen to which they are attached forms part of the cycle as in the morpholyl, piperidyl, and like groups.

The statement, that X must be of a different class than R when $R_1$ is hydrogen, means that X must not be aryl when R is aryl and $R_1$ is hydrogen; that X must not be alkyl when R is alkyl and $R_1$ is hydrogen; and X must not be aralkyl when R is aralkyl and $R_1$ is hydrogen.

It will be understood that the term "hydrazine compound" as employed herein and in the claims includes the salts of the hydrazines. Also, the term "hydrazine" when not followed by the word "compound" means the free base and excludes the salts.

One valence of a doubly bonded carbon atom, as employed in the above definitions and in the claims, will be understood to include compounds in which both the X and the Y valences are connected to the same carbon atom as in compounds represented by the formula

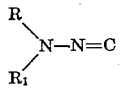

and to include compounds in which the valence is of a carbon atom which is doubly bonded to some element other than carbon as in the compounds represented by the formulae.

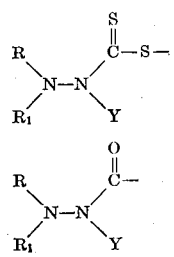

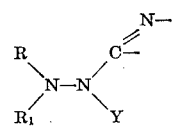

By the expression "an alkyl, aralkyl or aryl nucleus", it will be understood that the indicated group is bonded to the nitrogen directly by means of a carbon atom of such nucleus. Such nuclei may contain hydroxy, alkoxy, nitro, halogen or amino substituents. Also, the term "alkyl" includes both saturated and unsaturated aliphatic radicals.

Rubber is complex in nature and those skilled in the art are not in entire agreement as to its exact constitution. However, it appears that rubber comprises molecules of high molecular weight which are associated in some manner to produce the rubber gel. In order to influence the plasticity of this rubber gel, it is necessary to modify the associating forces between the molecules in some manner. When the hydrazines of our invention or their salts are added to the rubber, these compounds appear to reduce the molecular attraction to such an extent that the gellation is materially decreased and the rubber rendered much more plastic. It has not been determined whether or not the small amount of oxygen, which is combined with rubber in the form of peroxides or in some other form, exerts an important influence. It may be that these points of oxidation serve as points of weakness which permit the gel to be peptized in a manner more or less physically similar to the thinning of a gelatin jelly by means of acid.

The change in the state of the rubber gel induced by our compounds, is not instantaneous but requires more or less time to develop. While a small immediate effect may result, it is, in general, not great enough to be noticeable. However, upon standing for a period of time, the rubber, containing our compounds, becomes softened and continues to become softened until the effect is sufficient to be easily detectable by hand testing methods. This softening effect continues at a decreasing rate until an apparent equilibrium condition is reached, after which little or no further softening takes place. The length of time required to reach this equilibrium varies considerably for different compounds and decreases rapidly as the temperature is increased. A beneficial softening action will in general be noticed in periods of time which may vary from 15 minutes to two days. Also, the amount of softening which will be obtained over a given period of time will vary with the amount of plasticizing agent which is employed. However, the increase in softening effect of increased amounts of agent is not in proportion to the amount of agent added. The amount of agent to be added may be varied within an extremely wide range, depending upon the rubber, the other compounding ingredients and the desire of the user. However, for economical reasons, it will generally be found that from .1 to about 5% of the agent will be sufficient for most purposes.

Among the compounds which we have found to be particularly satisfactory for our purpose are:

phenyl hydrazine

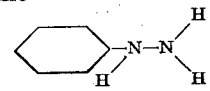

o-tolyl hydrazine

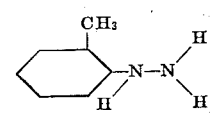

asymmetrical diphenyl hydrazine

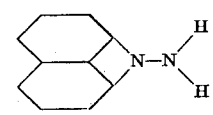

phenyl hydrazine CS₂ reaction product (phenyl dithio carbazimic phenyl hydrazine)

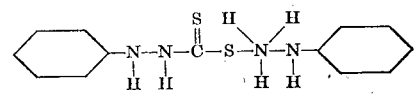

N,N' b-oxyethyl phenyl hydrazine

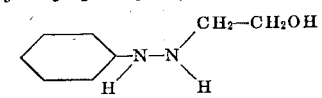

alpha naphthyl hydrazine

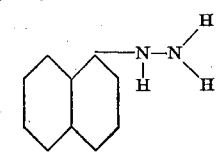

acetone phenyl hydrazone

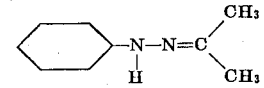

phenol salt of phenyl hydrazine

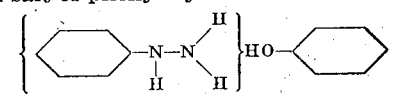

phenyl hydrazine hydrochloride

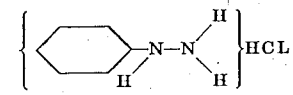

In order to more clearly illustrate our invention the preferred embodiments thereof and the advantageous results to be obtained thereby the following examples are given:

*Example 1*

A sample of smoked sheet rubber was treated by adding .5% of phenyl hydrazine thereto with the minimum amount of milling required for incorporation. This rubber was held at a temperature of 70° C. for 60 minutes after which it was considerably softened. A block of this rubber was then pressed into an irregular shaped mold at 40° C. and held for 10 minutes. When removed, the rubber was found to have flowed well into all the irregular portions of the mold. A second sample of smoked sheet, treated in a similar manner but without addition of phenyl hydrazine, had not flowed sufficiently in the mold to fill the sharp corners.

*Example 2*

Smoked sheet rubber was treated with .5% of phenyl hydrazine and held at room temperature for 18 hours after which it was quite soft. Three tread stocks were then compounded according to the following formulae.

|  | A | B | C |
|---|---|---|---|
| Milled smoked sheet rubber | 100 | 100 |  |
| Hydrazine treated rubber |  |  | 100 |
| Mineral oil |  | 5 |  |
| Carbon black | 45 | 45 | 45 |
| Zinc oxide | 5 | 5 | 5 |
| Sulfur | 3 | 3 | 3 |
| Mercapto benzo thiazole | 1 | 1 | 1 |

These compounds were then shaped by extruding through a die with a circular opening .5 inch in diameter. Compound A, which was not softened, extruded with an extremely rough and irregular surface. Compound B extruded more smoothly but was still rough and the diameter of the rubber, after extruding, was .68 inch. Compound C extruded with a smooth glossy surface and the diameter of the rubber, after extrusion, was only .56 inch.

*Example 3*

Smoked rubber was treated on the mill with .5% of phenyl hydrazine and samples when held at 70° C. and at 30° C. The relative plasticity was followed by measuring the thickness of a 2 ccm. pellet after pressing between parallel plates under a pressure of 2 kgs. for 5 minutes at 70° C. The following results were obtained.

| Minutes after milling | Relative plasticity in inches | |
|---|---|---|
|  | 70° C. Sample | 30° C. Sample |
| 5 | .259 | .259 |
| 20 | .231 |  |
| 60 | .228 | .254 |
| 360 | .225 |  |
| 960 | .223 |  |
| 1440 |  | .221 |

*Example 4*

Smoked sheet rubber was treated with .25% of phenyl hydrazine and permitted to cool from 80° C. to room temperature through a period of two hours. This rubber was then used to prepare the following compound.

| Rubber | 100 |
|---|---|
| Whiting | 100 |
| Lithopone | 10 |
| Ultra marine blue | 3 |
| Sulfur | 2 |
| Accelerators | 1 |
| Zinc oxide | 5 |

This compound was sheeted out and embossed by pressing at 50° C. with an engraved plate. A perfect impression was retained by the rubber.

A similar compound, prepared by adding the phenyl hydrazine to the rubber just before the compounding ingredients were added and which was then sheeted out and embossed immediately, received an imperfect impression.

*Example 5*

Portions of pale crepe rubber were treated with various hydrazine derivatives by incorporating on the rubber mill during 5 minutes milling at 70° C. These samples were permitted to remain at room temperature over night and were then compounded as follows.

| Rubber | 100 |
|---|---|
| Whiting | 100 |
| Soft carbon black | 30 |
| Stearic acid | 1 |
| Sulfur | 3 |
| Diortho tolyl guanidine | 1 |
| Zinc oxide | 5 |

These compounds were then extruded through a die which had an opening 1 inch long by .125 inch thick with the following results.

| Material added | Percent added | Thickness of rubber strip after extrusion | Appearance after tubing |
|---|---|---|---|
| None |  0 | .210 | Would not tube smooth. |
| o-tolyl hydrazine | .25 | .142 | Smooth. |
| Asymmetrical diphenyl hydrazine | .50 | .149 | Smooth. |
| Phenyl hydrazine CS₂ reaction product | .50 | .133 | Smooth and shiny. |
| N, N' b-oxy ethyl phenyl hydrazine | .30 | .147 | Smooth. |
| Alpha naphthyl hydrazine | .25 | .151 | Very slightly rough. |
| Phenol salt of phenyl hydrazine | .50 | .135 | Smooth and shiny. |
| Acetone phenyl hydrazone | 1.00 | .170 | Slightly rough. |
| Phenyl hydrazine hydrochloride | .30 | .140 | Smooth. |

It has also been found that the presence of sulfur exerts a retarding action on the rate of softening of the rubber so that the preferred method consists in treating the rubber and allowing a short rest period before the sulfur is added. The effect of sulfur is illustrated in the following example.

*Example 6*

To sample A of pale crepe rubber 3% of sulfur and .5% of phenyl hydrazine was added, to sample B only .5% of phenyl hydrazine was added and to sample C, which received the same milling period, nothing was added. After two hours at 50° C., each of the samples were given a period of milling at which time 3% of sulfur was added to samples B and C. Two cubic centimeter pellets of each sample were then caused to flow by pressing between parallel plates under a load of 2 kgs. at 70° C. The thickness of the three samples after 5 minutes was A .288 inch, B .277 inch and C .299 inch.

Certain pigments, such as carbon black, also exert a retarding action on the softening in which case a longer ageing period and, usually, a greater amount of plasticizing agent is required. For this reason, the preferred method of processing consists in treatment of the rubber followed by the development of the desired softness before the sulfur and fillers are incorporated after which the rubber may be shaped by the desired process.

Also, by adding the plasticizing agent to the rubber and allowing the agent to exert its effect before adding other compounding ingredients, the rubber is rendered more plastic on the mill and the incorporation of other compounding ingredients is greatly facilitated.

It is not necessary to mill the hydrazine compounds into the rubber. Some of the compounds are liquids and may be painted or sprayed on the surface of the rubber in thin sheets. Also, the agents may be dissolved in suitable solvents and painted or sprayed upon surfaces of thin sheets of the rubber or the solid compounds may be dusted on the rubber. When the agents are added to the rubber in this manner, they diffuse into the rubber and produce the desired softening effect.

The above examples are merely illustrative of our invention. Other compounds of our invention which have been successfully employed are:
Asymmetrical di-lauryl hydrazine,
N,N' phenyl benzyl hydrazine,
Mono-acetyl phenyl hydrazine,
The thiourea resulting from the action of phenyl mustard oil on phenyl hydrazine,
o-xenyl hydrazine,
The reaction product of phenyl hydrazine and carbon dioxide,
Phenyl hydrazine formate,
B-naphthol salt of phenyl hydrazine,
Phenyl hydrazine oxalate,
Phenyl hydrazine stearate,
o-tolyl hydrazine nitrate,
Asymmetrical methyl phenyl hydrazine sulfate,
o-xenyl hydrazine sulfate,
a-naphthyl hydrazine hydrochloride,
2:5-dichlorphenyl hydrazine acetate,
m-nitrophenyl hydrazine stearate,
N,N' B-hydroxyethyl phenyl hydrazine benzoate,
Asymmetrical diphenyl hydrazine phthalate,
Asymmetrical phenyl methyl hydrazine phosphate,
Phenyl hydrazine reacted with sulfur dioxide,
Ethyl sulphonyl derivative of 2:5-dichlorphenyl hydrazine,
Benzoyl derivative of 2:5-dichlorphenyl hydrazine,
m-nitrophenyl hydrazine,
p-nitrophenyl hydrazine,
2:5-dichlorphenyl hydrazine,
phenyl hydrazine formaldehyde reaction product,
Methyl propyl ketone phenyl hydrazone,
o-tolyl hydrazonium salt of the dithiocarbamic acid of o-tolyl hydrazine.

Other hydrazines which merit special attention are:
Asymmetrical di-tolyl hydrazines
Asymmetrical di-xylyl hydrazines
Asymmetrical di-biphenyl hydrazines
Asymmetrical di-naphthyl hydrazines
Asymmetrical phenyl tolyl hydrazines
Asymmetrical phenyl biphenyl hydrazines
Asymmetrical phenyl naphthyl hydrazines
Asymmetrical tolyl naphthyl hydrazines
Asymmetrical di-benzyl hydrazines
Asymmetrical phenyl benzyl hydrazines
Asymmetrical di-hydroxyphenyl hydrazines
Asymmetrical di-chlorphenyl hydrazines
Asymmetrical di-p-aminophenyl hydrazines
Asymmetrical phenyl phenol hydrazines
Asymmetrical tolyl phenol hydrazines
Asymmetrical di-anisyl hydrazines
Asymmetrical phenyl anisyl hydrazines
Asymmetrical methyl phenyl hydrazines
Mono xylyl hydrazines
Mono biphenyl hydrazines
Mono hydroxy phenyl hydrazines
Mono benzyl hydrazines
Mono chlorphenyl hydrazines
Mono aminophenyl hydrazines
Mono anisyl hydrazines
Mono methyl hydrazines
Mono lauryl hydrazines
Dichlorphenyl hydrazines
Nitrophenyl hydrazines The above hydrazines and other hydrazines heretofore mentioned may be employed as the free bases or as salts of any acid reacting compound which is sufficiently strongly acid to react with the hydrazines to form the salts. Among the acid substances which may be employed to form the salts are:
Phenol
b-naphthol
Cresols
Alpha naphthol
Xylenols
Catechol
Dihydroxy naphthalenes
Dihydroxy biphenyls
Formic acid
Stearic acid
Oxalic acid
Acetic acid
Benzoic acid
Phthalic acid
Propionic acid
Butyric acid
Oleic acid
Palmitic acid
Sulfonic acids
Naphthoic acid
Phenyl benzoic acid
Phenyl naphthoic acid
Naphthyl benzoic acid
Naphthyl naphthoic acid
Chlor acetic acids (mono- & di-)
Halogen substituted acids
Anthranilic acids
Anthracene carboxylic acids
Hydrochloric acid
Nitric acid
Sulfuric acid
Phosphoric acid
Sulphur dioxide
Carbon dioxide
Ethyl sulfonic acid
Dithiocarbamic acid of phenyl hydrazine
Dithiocarbamic acid of o-tolyl hydrazine
Other dithiocarbamic acids It will be apparent that a wide variety of hydrazines and their salts may be employed. Within the limits of the type formula

as defined hereinbefore, the components R, R₁ and X may represent methyl, ethyl, propyl, butyl, isobutyl, tertiary butyl, amyl, isoamyl, allyl, crotyl, butylene, lauryl, stearyl or other saturated or unsaturated alkyl group or may be benzyl, ring substituted benzyl, naphthyl methyl or other aralkyl groups or may be substituted or unsubstituted aromatic radicals such as dimethylphenyl, ethylphenyl, nitrophenyl, chlorphenyl, aminophenyl, chlornaphthyl, nitronaphthyl, alkylnaphthyl, biphenyl, alkylbiphenyl, chlorbiphenyl, nitrobiphenyl, aminobiphenyl, cyclohexyl, and the like, or other groups which are generally known to be aliphatic or aromatic in nature.

The hydrazines of our invention and their salts are in general well known compounds and the methods of preparing the same are also well known and described in the literature. The salts will generally be prepared by adding the acid compound directly to the hydrazine or by fusing the hydrazine and the acid compound together or by reacting them in a non-aqueous solvent such as dry benzene, ether and the like. Any acid substances either organic or inorganic of a strength sufficient to form a salt under such circumstances may be employed to form the corresponding salt which salt will be effective for our purpose.

While we have disclosed the preferred embodiments of our invention it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:

1. In the art of compounding rubber, the step of plasticizing unvulcanized rubber which consists in subjecting the rubber, in the absence of more than 3% of sulfur, to sufficient amounts of an unsymmetrically substituted hydrazine for a sufficient length of time for said hydrazine to effect a marked increase in the capacity of the rubber to flow under a load over that which the rubber would have if subjected to the same conditions in the absence of said hydrazine.

2. In the art of compounding rubber, the step of plasticizing unvulcanized rubber which consists in subjecting the rubber, in the absence of sulfur, to sufficient amounts of an unsymmetrically substituted hydrazine for a sufficient length of time for said hydrazine to effect a marked increase in the capacity of the rubber to flow under a load over that which the rubber would have if subjected to the same conditions in the absence of said hydrazine.

3. In the art of compounding rubber, the step of plasticizing unvulcanized rubber which consists in subjecting the rubber, in the absence of more than 3% of sulfur, to sufficient amounts of an unsymmetrically substituted hydrazine compound represented by the formula

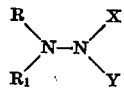

for a sufficient length of time for said hydrazine to effect a marked increase in the capacity of the rubber to flow under a load over that which the rubber would have if subjected to the same conditions in the absence of said hydrazine.

4. In the art of compounding rubber, the step of plasticizing unvulcanized rubber which consists in subjecting the rubber, in the absence of more than 3% of sulfur, to sufficient amounts of an unsymmetrically substituted hydrazine containing at the most 3 substituent groups for a sufficient length of time for said hydrazine to effect a marked increase in the capacity of the rubber to flow under a load over that which the rubber would have if subjected to the same conditions in the absence of said hydrazine.

5. In the art of compounding rubber, the step of plasticizing unvulcanized rubber which consists in subjecting the rubber, in the absence of more than 3% of sulfur, to sufficient amounts of an unsymmetrically substituted hydrazine containing at the most 2 substituent groups, each of the substituent groups being an organic group having a carbon atom thereof directly bonded to a nitrogen of the hydrazine nucleus, for a sufficient length of time for said hydrazine to effect a marked increase in the capacity of the rubber to flow under a load over that which the rubber would have if subjected to the same conditions in the absence of said hydrazine.

6. In the art of compounding rubber, the step of plasticizing unvulcanized rubber which consists in subjecting the rubber, in the absence of more than 3% of sulfur, to sufficient amounts of mono-substituted hydrazine, in which the substituent is an aromatic radical having a ring carbon atom thereof directly bonded to a nitrogen of the hydrazine nucleus, for a sufficient length of time for said hydrazine to effect a marked increase in the capacity of the rubber to flow under a load over that which the rubber would have if subjected to the same conditions in the absence of said hydrazine.

7. In the art of compounding rubber, the step of plasticizing unvulcanized rubber which consists in subjecting the rubber, in the absence of more than 3% of sulfur, to sufficient amounts of phenyl hydrazine for a sufficient length of time for said hydrazine to effect a marked increase in the capacity of the rubber to flow under a load over that which the rubber would have if subjected to the same conditions in the absence of said hydrazine.

8. In the art of compounding rubber, the step of plasticizing unvulcanized rubber which consists in subjecting the rubber, in the absence of more than 3% of sulfur, to sufficient amounts of a mono-substituted hydrazine, in which the substituent is a tolyl radical having a ring carbon atom thereof directly bonded to a nitrogen of the hydrazine nucleus, for a sufficient length of time for said hydrazine to effect a marked increase in the capacity of the rubber to flow under a load over that which the rubber would have if subjected to the same conditions in the absence of said hydrazine.

9. Unvulcanized rubber of increased plasticity obtainable by subjecting the rubber, in the absence of more than 3% of sulfur, to sufficient amounts of an unsymmetrically substituted hydrazine for a sufficient length of time for said hydrazine to effect a marked increase in the capacity of the rubber to flow under a load over that which the rubber would have if subjected to the same conditions in the absence of said hydrazine.

10. Unvulcanized rubber of increased plasticity obtainable by subjecting the rubber, in the absence of sulfur, to sufficient amounts of an unsymmetrically substituted hydrazine for a sufficient length of time for said hydrazine to effect a marked increase in the capacity of the rubber to flow under a load over that which the rubber would have if subjected to the same conditions in the absence of said hydrazine.

11. Unvulcanized rubber of increased plasticity obtainable by subjecting the rubber, in the absence of more than 3% of sulfur, to sufficient amounts of an unsymmetrically substituted hydrazine compound represented by the formula

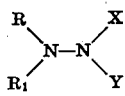

for a sufficient length of time for said hydrazine to effect a marked increase in the capacity of the rubber to flow under a load over that which the rubber would have if subjected to the same conditions in the absence of said hydrazine.

12. Unvulcanized rubber of increased plasticity obtainable by subjecting the rubber, in the absence of more than 3% of sulfur, to sufficient amounts of phenyl hydrazine for a sufficient length of time for said hydrazine to effect a marked increase in the capacity of the rubber to flow under a load over that which the rubber would have if subjected to the same conditions in the absence of said hydrazine.

13. Unvulcanized rubber of increased plasticity obtainable by subjecting the rubber, in the absence of more than 3% of sulfur, to sufficient amounts of a mono-substituted hydrazine, in which the substituent is a tolyl radical having a ring carbon atom thereof directly bonded to a nitrogen of the hydrazine nucleus, for a sufficient length of time for said hydrazine to effect a marked increase in the capacity of the rubber to flow under a load over that which the rubber would have if subjected to the same conditions in the absence of said hydrazine.

IRA WILLIAMS.
CARROLL CUMMINGS SMITH.